United States Patent
Bosch et al.

(10) Patent No.: US 11,991,314 B1
(45) Date of Patent: May 21, 2024

(54) CALCULATING AN ESTIMATED WAIT TIME AT A CONTACT CENTER

(71) Applicant: Zoom Video Communications, Inc., San Jose, CA (US)

(72) Inventors: Kristin Renae Bosch, Denver, CO (US); Maikl Adly Abdel-Malek Eskander, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/150,589

(22) Filed: Jan. 5, 2023

Related U.S. Application Data

(60) Provisional application No. 63/426,660, filed on Nov. 18, 2022.

(51) Int. Cl.
  *H04M 3/523* (2006.01)
  *G06F 40/40* (2020.01)
  *H04M 3/51* (2006.01)

(52) U.S. Cl.
  CPC .......... *H04M 3/5238* (2013.01); *G06F 40/40* (2020.01); *H04M 3/5175* (2013.01); *H04M 3/5233* (2013.01); *H04M 2203/2038* (2013.01); *H04M 2203/407* (2013.01)

(58) Field of Classification Search
  None
  See application file for complete search history.

(56) References Cited

U.S. PATENT DOCUMENTS

| | | | |
|---|---|---|---|
| 8,259,925 B2 | 9/2012 | Smith et al. | |
| 8,761,380 B2 | 6/2014 | Kohler et al. | |
| 9,172,810 B2 | 10/2015 | McCormack et al. | |
| 2003/0108187 A1* | 6/2003 | Brown | H04M 3/523 379/266.03 |
| 2007/0263836 A1* | 11/2007 | Huang | H04M 3/5191 379/265.01 |
| 2013/0022195 A1* | 1/2013 | Nimmagadda | H04M 3/5238 379/266.06 |
| 2020/0374402 A1* | 11/2020 | Adibi | H04M 3/5235 |

* cited by examiner

*Primary Examiner* — Harry S Hong
(74) *Attorney, Agent, or Firm* — Young Basile Hanlon & MacFarlane, P.C.

(57) ABSTRACT

A server receives a request for communication with a contact center agent device from a user device. The server determines a number of devices preceding the user device in a user queue of devices for communicating with the contact center agent device. The server determines a number of contact center agent devices available for the communication. The server periodically calculates an estimated wait time for the user device as a mathematical combination based on the number of devices preceding the user device, the number of agent devices, and previous wait times of other user devices requesting communications with the contact center agent device. The server transmits, to the user device, an output associated with the estimated wait time.

20 Claims, 9 Drawing Sheets

600

ESTIMATED WAIT TIME

602

EWT = PREDICTEDAHT * POSITIONINQUEUE / NUMBEROFAGENTS
↳ UPDATED EVERY 15 MIN

604

EWT = PREDICTEDAHT * POSITIONINQUEUE / NUMBEROFAGENTS
↳ UPDATED AFTER EVERY
   CALL FOR THE FIRST 15 MIN

606

EWT = PREDICTIVE MODEL
↓
UPDATED AFTER EVERY
CALL FOR THE FIRST 15 MIN

CALCULATING AN ESTIMATED WAIT TIME AT A CONTACT CENTER

FIELD

This disclosure relates to calculating an estimated wait time at a contact center which may be implemented over a telephone or computer network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
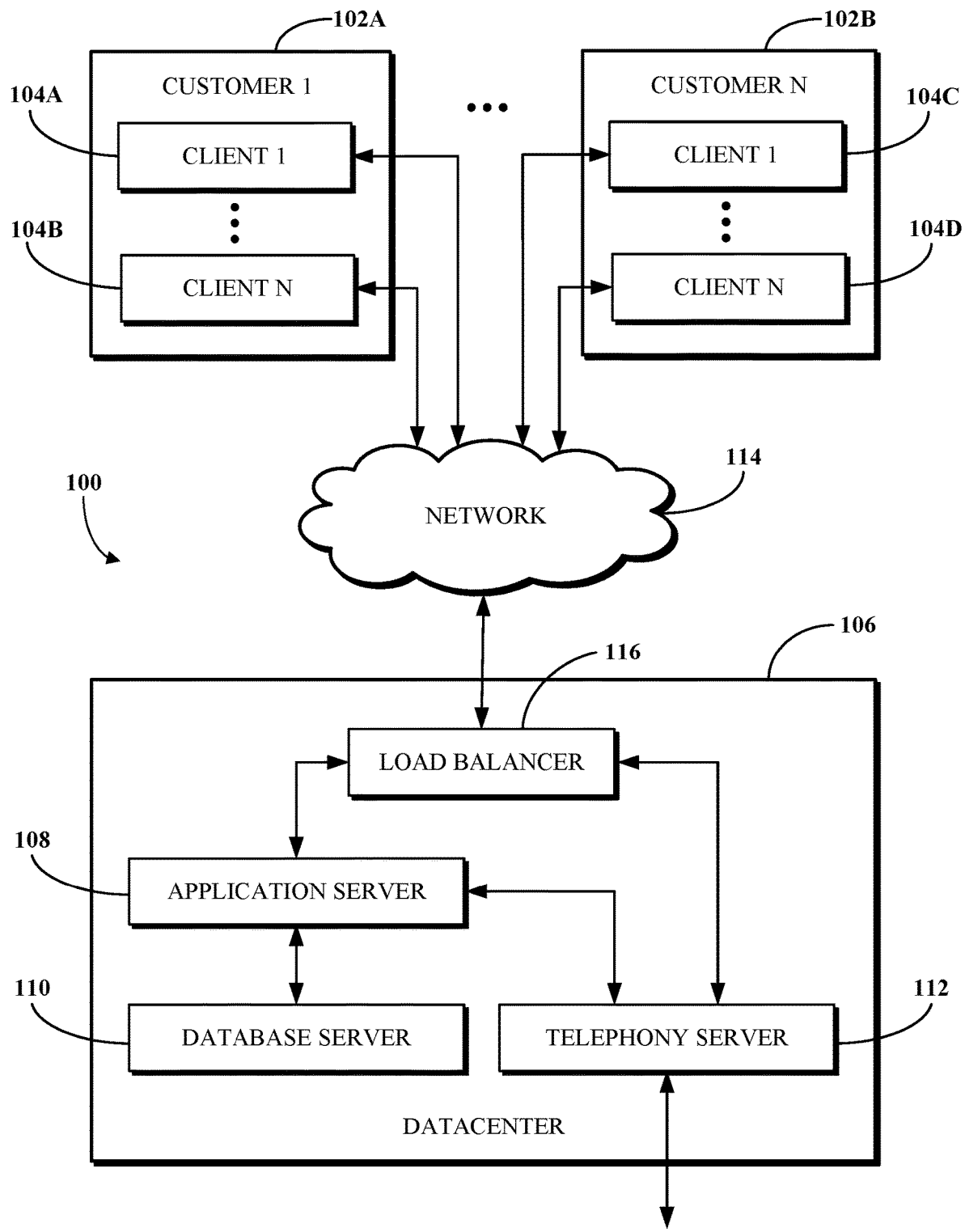
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

The contact center may provide one-to-one communication between a contact center user device (i.e., a device operated by a person who initiates an engagement with a contact center) and a contact center agent device (i.e., a device operated by an agent of the contact center), for example, using telephone, online voice calling, or online video calling technology. However, oftentimes, there may be multiple user devices attempting to access agents of the contact center at a given time. In such circumstances, it may be desirable to notify users of the user devices of an estimated wait time, such as to improve the user experience of using the contact center and to allow the users to plan other activities that they may engage in while waiting to be connected to an agent. Calculating an estimated wait time for a user device attempting to communicate with a contact center agent device at a contact center may be desirable in order to notify the user of the wait time.

Implementations of this disclosure address problems such as these by calculating an estimated wait time at a call center using a combination of techniques. A server of a contact center receives a request for communication with a contact center agent from a user device. For example, a user of the user device may initiate an audio call (e.g., a telephone call) or a video call with the contact center and request to speak to a contact center agent (e.g., as opposed to communicating with an automated agent or using a self-service menu or interactive voice response (IVR) menu). The server determines a number of devices preceding the user device in a user queue. The user queue may include other user devices who initiated calls with the contact center prior to the user device and requested to speak to the agent. The server determines a number of contact center agents available for the communication. The server periodically (e.g., once every threshold time period or upon an occurrence of an event, such as a termination of a communication session with a contact center agent device) calculates an estimated wait time for the user device using a combination engine, the combination engine taking into account the number of devices preceding the user device, the number of agent devices, and previous wait times of other user devices requesting communications with the contact center agent device. The server transmits, to the user device, an output associated with the estimated wait time (e.g., an audio recording stating the number of minutes in the estimated wait time).

In some implementations, the combination engine takes into account the number of devices preceding the user device divided by the number of agent devices and a value computed by a statistical engine (e.g., an artificial intelligence engine) based on the previous wait times of the other devices requesting the communications with the contact center agent device. In some implementations, the combination engine calculates a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

As used herein, the phrase "average hold time" may include, among other things, an average amount of time the users of the user devices spends communicating with the contact center agent and not the amount of time the user spends waiting before being connected with the contact center agent. The average hold time may be a fixed value. Alternatively, the average hold time may be computed using artificial intelligence techniques based on at least one of the time of day, the day of the week, the calendar date, or the like.

As used herein, the term "engine" may include, among other things, a component of a physical computer or virtual machine that performs certain functions. The engine may be implemented using software that is stored in a memory and executed by processing circuitry. Alternatively, the engine may be hard-wired into the processing circuitry and implemented using hardware. In some cases, the engine may include both software and hardware components. An engine may include one or more sub-engines, each of which performs part of the functionality of the engine.

To describe some implementations in greater detail, reference is first made to examples of hardware and software structures used to implement calculating an estimated wait time at a contact center. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
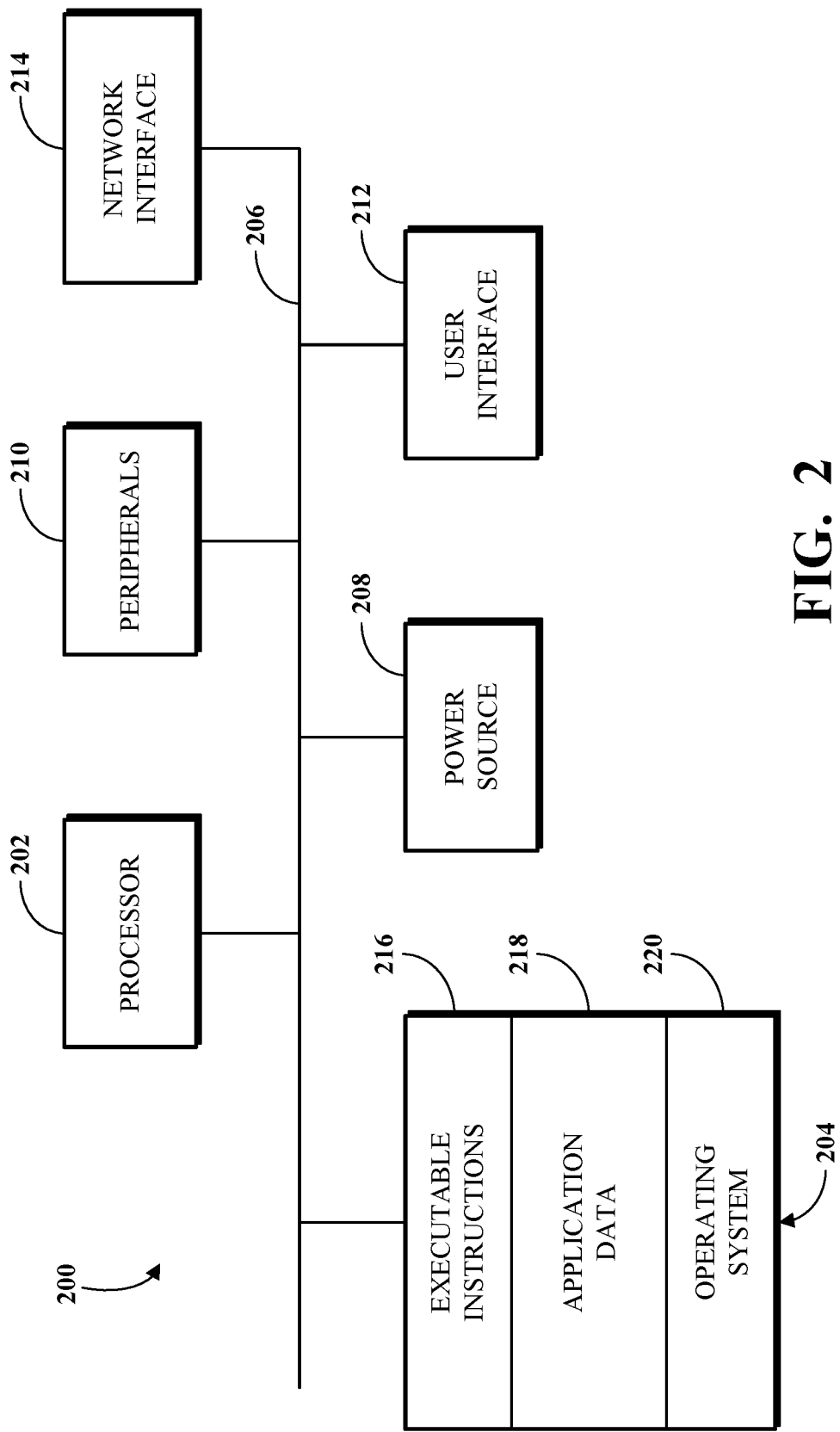
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
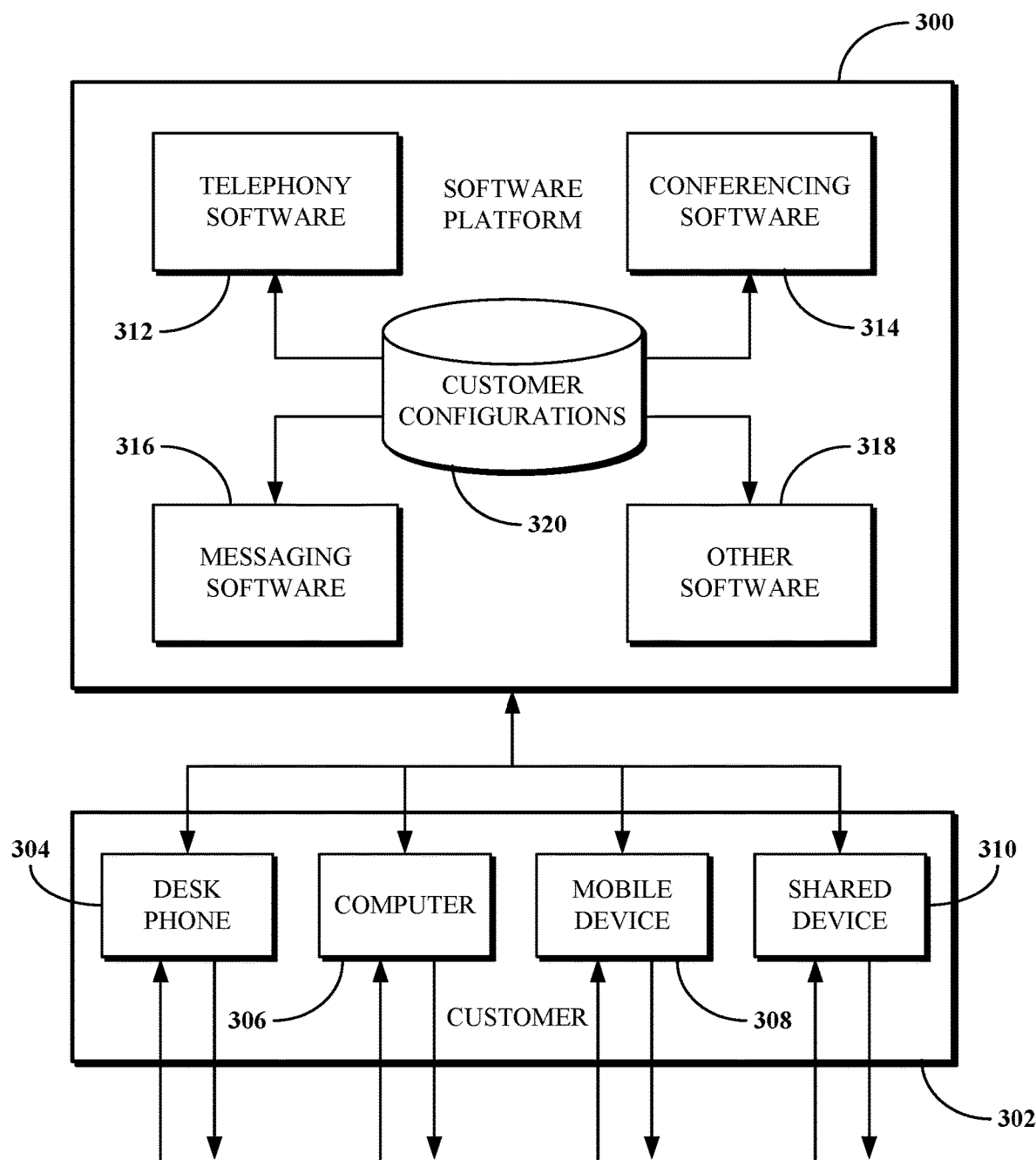
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for calculating an estimated wait time at a contact center.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
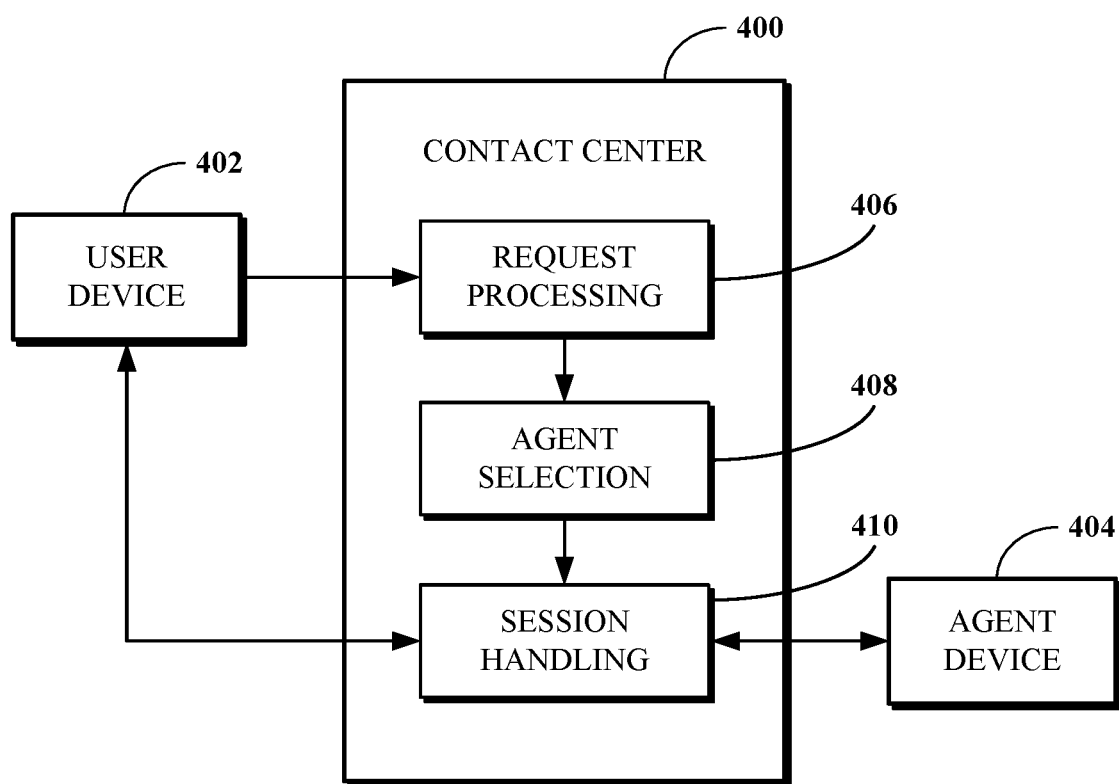
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a7 client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
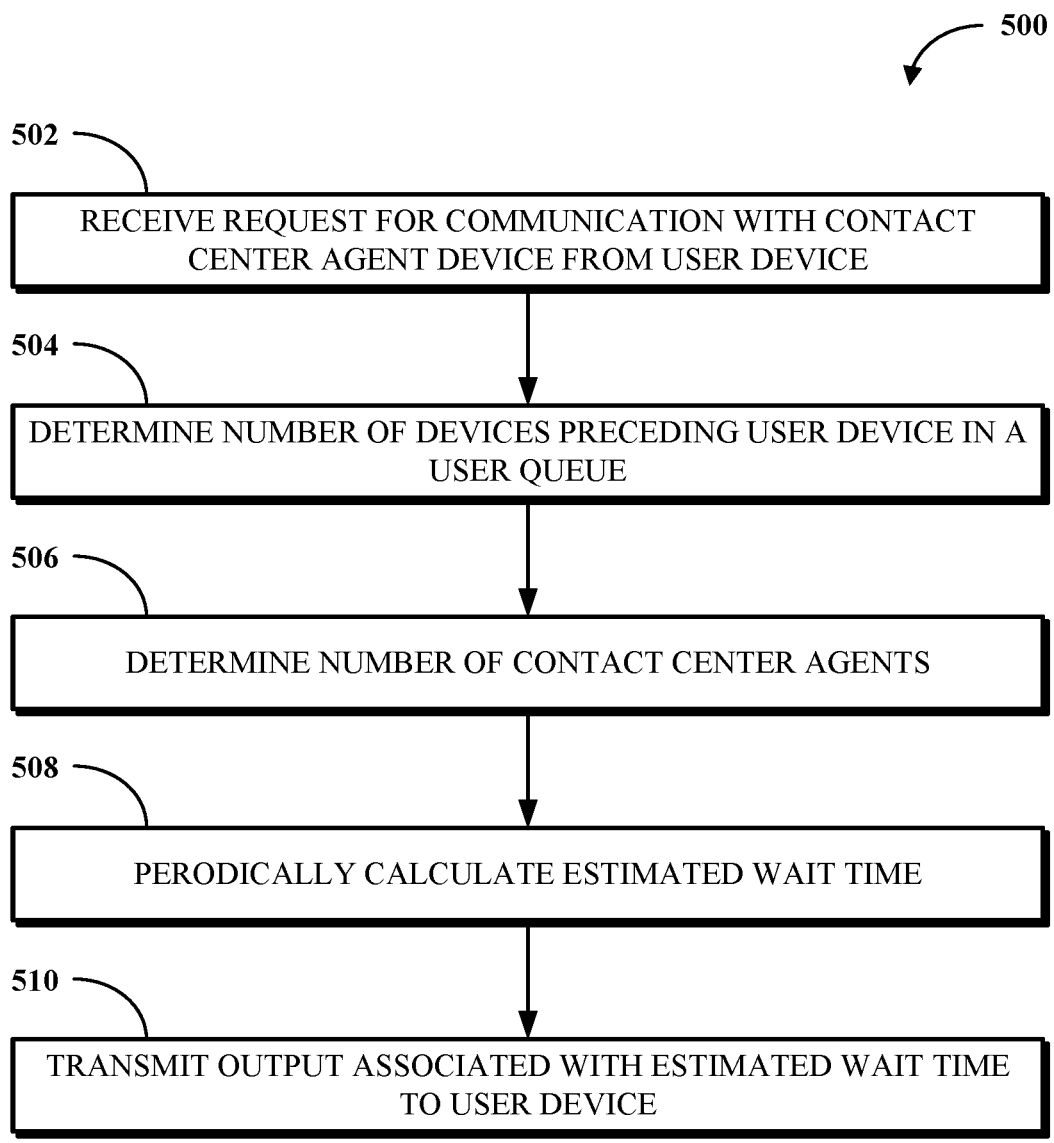
FIG. 5 is a flowchart of an example of a technique for calculating an estimated wait time at a contact center.

To further describe some implementations in greater detail, reference is next made to examples of techniques which may be performed by calculating an estimated wait time at a contact center. FIG. 5 is a flowchart of an example of a technique 500 for calculating an estimated wait time at a contact center. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500 or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 500 may be implemented at a server of a contact center, for example, the contact center 400. The technique 500 may be implemented in parallel with at least one of the request processing software 406, the agent selection software 408, or the session handling software 410.

At 502, the server receives a request for communicating with a contact center agent device (e.g., the agent device 404) operated by a human agent from a user device (e.g., the user device 402). For example, a user of the user device may request to speak with a representative after accessing the contact center (e.g., by dialing a toll-free telephone number of the contact center or accessing a video chat application associated with the contact center). The request for communicating with the contact center agent device may be transmitted to the server over a network. The network may include at least one of the Internet, the PSTN, or a cellular network.

At 504, the server determines a number of devices preceding the user device in a user queue of devices for communicating with the contact center agent device. The user queue may include previous user devices that accessed the contact center prior to the user device and are waiting to be connected with the contact center agent device. The user queue may be stored at the server and may be implemented using a queue data structure. A queue data structure is a first in first out (FIFO) data structure, where the first datum (e.g., user device identifier) added is the first datum removed for processing (e.g., communication with a contact center agent device). A queue data structure may be used to represent real-world scenarios such as a checkout line at a supermarket or a security line at an airport, where the first person to enter the line is the first person to leave the line.

In some cases, the user queue may include a subset of the previous user devices that have a dedicated set of agents assigned to them. For example, a contact center of a bank may have separate agents for mortgage accounts and for savings accounts. If a user specifies that they are calling about a mortgage account prior to requesting to speak with the agent, the user device of the user may be placed into the mortgage user queue, which is separate from the savings user queue. In this case, the number of devices preceding the user device in the user queue would include devices calling about mortgages but not devices calling about savings.

The contact center may have multiple user queues based on at least one of: a service related to the user's request (e.g., savings or mortgage), a natural language spoken by the user (e.g., English, Spanish, French, or Chinese), a skill of an agent requested by the user (e.g., assistance with New York State income tax or California income tax). A user device may be assigned to a user queue based on a request received from the user device upon connection to the contact center. For example, upon connection to the contact center, the user may be requested to specify their reason for accessing the contact center, and the appropriate user queue may be determined by applying natural language processing on the state reason. In one example, if a user is speaking Spanish and asking about a mortgage, they are assigned to the user queue of Spanish speakers in the mortgage department. Alternatively, if a user says or types, "I need help with my California state taxes," the user may be assigned to the "California income tax" user queue.

At 506, the server determines a number of contact center agent devices available for the communication. The contact center agent devices may include all of the contact center agent devices in the contact center. Alternatively, if the user of the user device specified a division of the contact center (e.g., mortgage or savings) with which they wish to speak or was assigned to a specified user queue (e.g., Spanish-speaking mortgage representatives), the contact center agent devices may include devices assigned to that division. The number of contact center agent devices may be determined based on network connection data between the server and the contact center agent devices. For example, when a contact center agent is working, the contact center agent device may be connected to the server and may indicate that it is available to accept calls. If the contact center agent device disconnects from the network or accepts a personal call, the server may be notified that the contact center agent device is disconnected, and the server may adjust (in estimated wait time calculations) the number of contact center agent devices based on the contact center agent device being disconnected.

At 508, the server periodically calculates an estimated wait time for the user device. The estimated wait time may be calculated using a combination engine that takes into account the number of devices preceding the user device, the number of agent devices, and previous wait times of other user devices requesting communications with the contact center agent device. In some examples, the combination engine takes into account the number of devices preceding the user device divided by the number of agent devices and a value computed by a statistical engine based on the previous wait times of the other devices requesting the communications with the contact center agent device. In some examples, the combination engine calculates a mean (or another combination, such as a median) of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

The statistical engine may implement any statistical techniques. In some cases, the statistical engine includes an artificial intelligence engine. The artificial intelligence engine may include an artificial neural network which may be trained using supervised learning techniques. The statistical engine may periodically recalculate the estimated wait time value. For example, the statistical engine may recalculate the estimated wait time value every 15 minutes or other threshold time period.

Periodically calculating may include calculating every threshold time period (e.g., every 15 minutes). Alternatively, periodically calculating may include calculating at a call termination of one of the devices preceding the user device in the user queue. In some cases, periodically calculating may include calculating at a call termination of one of the devices preceding the user device in the user queue after the first 15 minutes (or other preset time period) of the user device waiting to be connected to the contact center agent device. In some cases, periodically calculating may include calculating when a number of contact center agent devices available for the communication changes, for example, when a contact center agent device is added (e.g., due to a contact center agent starting work) or removed (e.g., due to a contact center agent finishing work).

At 510, the server transmits, to the user device, an output associated with the estimated wait time. The output may include an audio recording stating the estimated wait time. In a video call implementation, the output may include a display of the estimated wait time at the user device. In some cases, the display of the estimated wait time may be color coded (e.g., red if the estimated wait time exceeds 10 minutes, yellow if the estimated wait time is between 5 and 10 minutes, and green if the estimated wait time is less than 5 minutes).

Some implementations include callback features, where a user of a user device may opt to receive a callback (e.g., via a telephone number or video calling account) instead of remaining on hold while waiting for connection to an agent device. If the estimated wait time (e.g., computed as disclosed herein) exceeds a callback threshold (e.g., 5 minutes), the user of the user device may be offered a callback instead of remaining on hold while being in the user queue. The user would, in response to a prompt, provide a telephone number or account identifier in a messaging, voice calling, or video calling service for the callback. Alternatively, the user device's caller identification information or the information of the account the user device is using to access the contact center may be used. The callback threshold may be set manually by an administrator of the contact center or a business (or other entity) that uses the contact center to assist users. In some cases, the callback threshold is set dynamically. For example, the callback threshold may be lower during business hours on business days and higher during non-business hours. Alternatively, the callback threshold may be a function of the number of user devices in the user queue and/or the number of available contact center agent devices.

If the user requests the callback, the user device would maintain their place in the user queue. Upon an agent device being available for communication with the user device, the agent device would attempt to connect with the user device (e.g., by dialing a telephone number or contacting the user via the provided account identifier). As a result of this technology, the user would not have to remain on hold and waste the processing capabilities, network access capabilities, and battery life of the user device while waiting to be connected to the agent device.

In some cases, the user may request (in response to the prompt) to be connected to the next available agent device. Alternatively, during times when the ratio of user devices in the user queue to agent devices associated with the user queue exceeds a threshold ratio (e.g., 2.5) or during times when the estimated wait time for the last user device in the user queue exceeds a threshold time (e.g., 20 minutes), the user device may be offered to receive a callback at a later time and, with the user's approval, the user device may be called back when there is less contention for agent devices. Alternatively, user devices which may be called back later may be identified automatically, for example, based on a stated reason why the user device is accessing the contact center. A user device with an urgent request (e.g., a newly-reported network outage) may be assigned to speak to the next available agent device, while a user device associated with a less urgent request (e.g., a request to reduce a cable bill) may be notified that they will receive the callback at the later time when there is less contention for agent devices. The urgency of the request may be determined using an artificial intelligence model, for example, trained by supervised learning techniques. In some cases, compensation (e.g., $2 discount on next month's cable bill) may be offered to the user of the user device in exchange for agreeing to receive the callback at the later time. Offers of such compensation may be limited (e.g., once per year for each account) to prevent strategic access of the contact center to receive compensation.

In some implementations, the server determines that the estimated wait time for the user device exceeds the callback threshold. In at least some such cases, the contact center provides, to the user device, a prompt to receive a callback via a user-specified communication account (e.g., a telephone number or an identifier of a voice or video calling account) when the contact center agent device becomes available. In response to acceptance of the prompt, and upon determining that the contact center agent device is available, the server connects the contact center agent device with the user-specified communication account.

Figure 6:
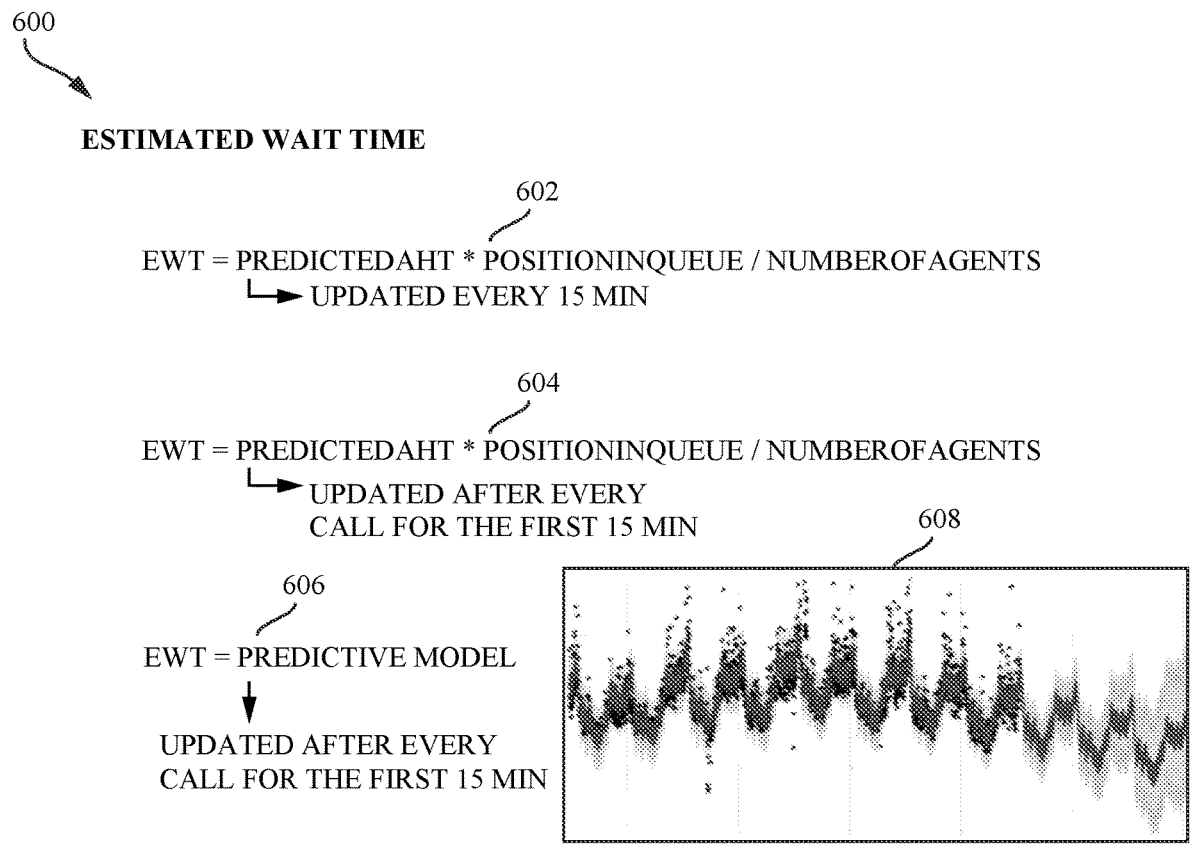
FIG. 6 illustrates examples of estimated wait time calculations.

FIG. 6 illustrates examples of estimated wait time calculations 600. The calculations illustrated in FIG. 6 may correspond to block 508 of FIG. 5. According to a technique 602, EWT [estimated wait time] is equal to predicted AHT [average hold time] multiplied by the position in the user queue of the user device divided by the number of agents. This is updated every 15 minutes (or other threshold time period). According to a technique 604, EWT is equal to predicted AHT multiplied by the position in the user queue of the user device divided by the number of agents. This is updated after every call termination (at a contact center agent device) for the first 15 minutes (or other threshold time period).

According to a technique 606, the EWT is predicted by a predictive model. The predictive model is a statistical model (e.g., an artificial intelligence model) that takes into account at least one of: the predicted AHT, the position in the user queue, the number of agents, the time of day, the day of the week, the date, or any other information available to the contact center. The predictive model may take into account the wait times of the users as a function of time illustrated in a graph 608. According to another technique, the predicted EWT is a median of the estimated wait time value computed by the technique 602, the estimated wait time value computed by the technique 604, and the estimated wait time value computed by the technique 606. Alternatively, a mean may be used in place of the median.

In some aspects, a server receives a request for communication with a contact center agent device from a user device. The server determines a number of devices preceding the user device in a user queue of devices for communicating with the contact center agent device. The server determines a number of contact center agent devices available for the communication. The server periodically calculates an estimated wait time for the user device as a combination based on the number of devices preceding the user device, the number of agent devices, and previous wait times of other user devices requesting communications with the contact center agent device. The server transmits, to the user device, an output associated with the estimated wait time.

In some cases, the combination is a combination of the number of devices preceding the user device divided by the number of agent devices and a value computed by a statistical engine based on the previous wait times of the other devices requesting the communications with the contact center agent device.

In some cases, the combination comprises a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

Figure 7:
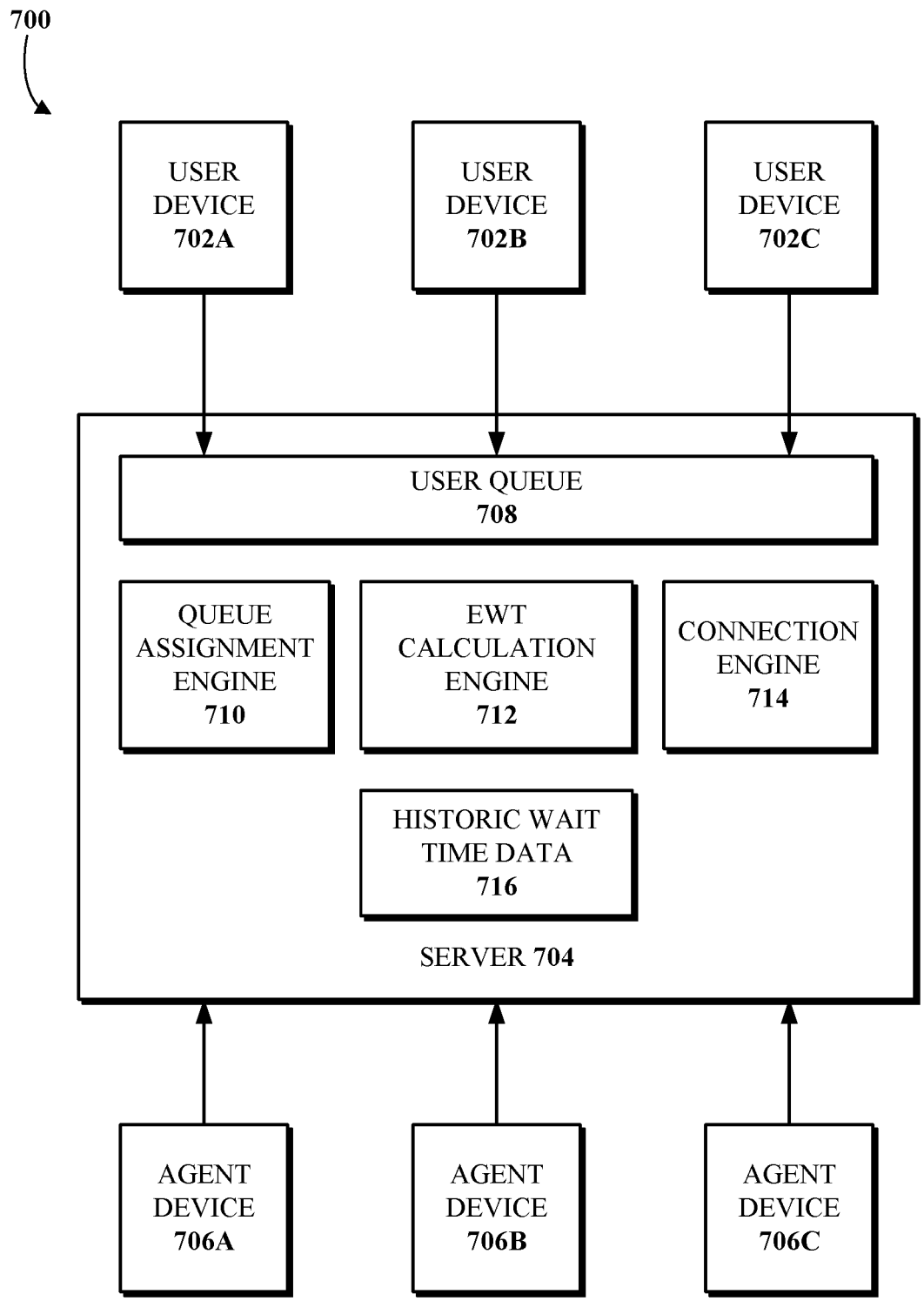
FIG. 7 is a block diagram of an example of a contact center system for assigning user devices to agent devices.

FIG. 7 is a block diagram of an example of a contact center system 700 for assigning user devices to agent devices. As shown, the system 700 includes user devices 702A-C, a server 704, and agent devices 706A-C. The user devices 702A-C may correspond to the user device 402, the server 704 may correspond to the contact center 400. The agent devices 706A-C may correspond to the agent device 404.

As shown in FIG. 7, user devices 702A-C connect to the server 704, for example, by dialing a telephone number of a contact center, accessing the contact center via an application or website of the contact center, or accessing the contact center via an instant messaging, voice calling, or video calling service. Upon accessing the contact center, the user devices 702A-C are added to a user queue 708 for servicing by one of the agent devices 706A-C when one of the agent devices 706A-C becomes available (e.g., becomes finished serving other users or begins its work time).

As shown, all of the user devices 702A-C are assigned to the same user queue 708. In alternative implementations, a queue assignment engine 710 assigns the user devices 702A-C to one of multiple user queues, with each user queue corresponding to a set of agent devices 706A-C capable of servicing that user queue. The user queues may correspond to different division/services of a business (e.g., savings or mortgage), agent skills (language skills, knowledge of different computer operating systems for information technology support, or knowledge of tax rules of different jurisdictions), or agent permissions (e.g., process refund, or initiate an insurance payment to a customer). In one example, when a user device 702A accesses the server 704, the user of the user device is prompted to specify a reason for contacting the contact center. Natural language processing is applied to a reason received from the user device 702A to determine the appropriate user queue to which to assign the user device 702A. The queue assignment engine 710 identifies, using a natural language processing engine, features (e.g., associated department/service, skills, or permissions) of a contact center agent based on the natural language text or speech in the specified reason and selects, from multiple user queues, the user queue for the user device 702A based on the features. The natural language processing engine may be a sub-engine of the queue assignment engine 710.

Alternatively, the user queue may be selected by the user in response to a menu presented on a screen (e.g., in a video call) or an IVR menu presented in a telephone call. In one example use case, a user telephoning or video calling a contact center of a car dealership may be asked to type 1 to be placed in the "sales" user queue, type 2 to be placed in the "service" user queue, or type 3 to be placed in the "financing" user queue. Each of the "sales," "service," and "financing" user queues has its own separate and distinct agent devices associated with agents who service the user queue and user devices waiting for service, by the agent devices, in the user queue.

As shown, the server 704 includes an EWT calculation engine 714. The EWT calculation engine 712 calculates the EWT for each user device 702A-C in the user queue 708 and periodically (or persistently) outputs the calculated EWT to the associated user device 702A-C. The EWT may be calculated using the techniques described in conjunction with FIGS. 5-6. More details of the EWT calculation engine 712 are discussed in conjunction with FIG. 8. After the EWT is calculated, the EWT may be provided to the associated user device 702A-C for visual or audio output at the associated user device 702A-C.

As illustrated, the server 704 includes a connection engine 714. The connection engine 714, when executed, connects a user device 702A-C from the user queue 708 with an available agent device 706A-C. The agent device 706A-C may be selected for connection when it becomes available (e.g., upon the associated agent beginning work or completing a communication session with another user device). The user device 702A-C may be selected based on its position in the user queue 708. In some implementations, the user queue 708 is a first-in-first-out (FIFO) data structure to ensure that the user device which spent the most time waiting for service is first assigned to the available agent device. (For example, if the user device 702A is placed in the user queue 708 before the user device 702B, the user device 702A will be connected to the agent device 706A-C before the user device 702B.) Alternatively, other techniques for selecting the user device to be serviced by the available agent device may be used. The connection engine 714 may use voice or video call forwarding or other communication session routing techniques to connect the user device 702A-C with the available agent device 706A-C.

As shown, the server 704 stores historic wait time data 716. The historic wait time data includes historic wait times of user devices 702A-C in the user queue 708 (and, in some cases, other user queues associated with the server 704). The historic wait time data 716 may be used by the EWT calculation engine 712, for example, if the EWT calculation engine leverages statistics, artificial intelligence, or machine learning to calculate the EWT.

Figure 8:
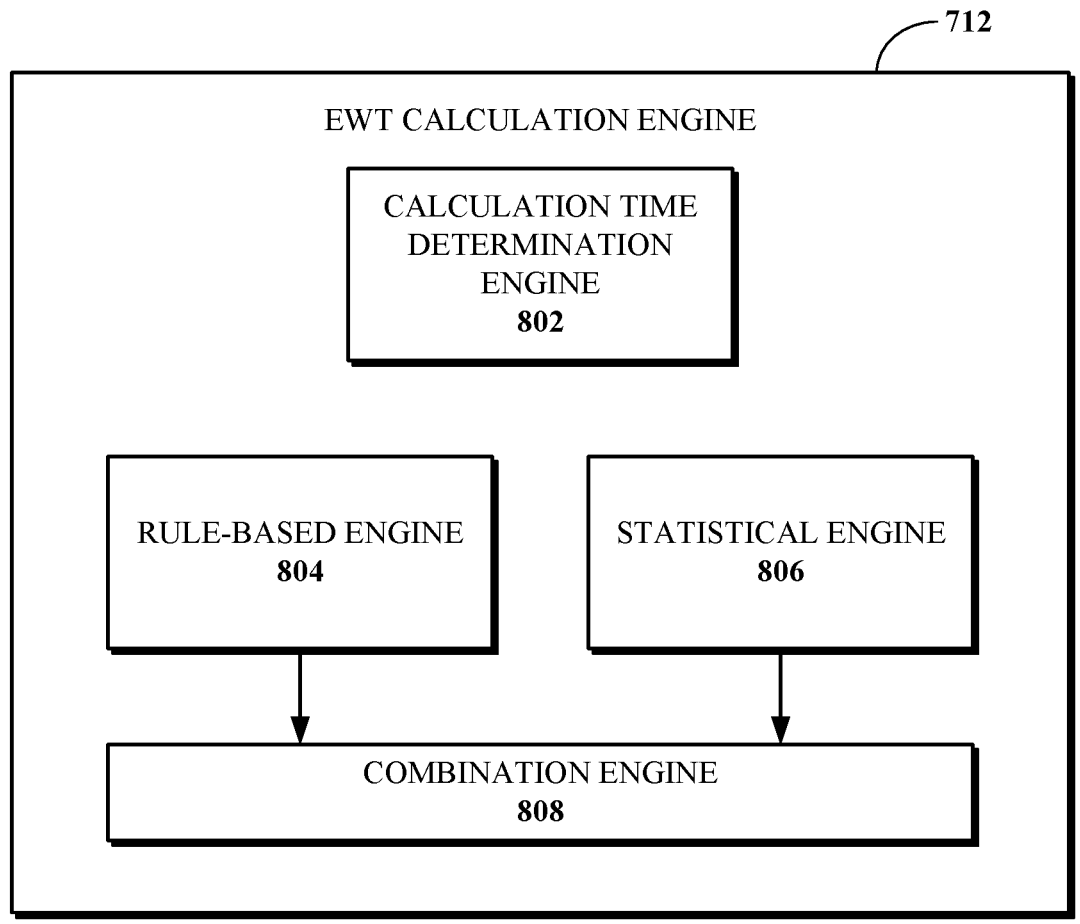
FIG. 8 is a block diagram of an example estimated wait time calculation engine.

FIG. 8 is a block diagram of an example of the EWT calculation engine 712. As shown, the EWT calculation engine includes a calculation time determination engine 802, a rule-based engine 804, a statistical engine 806, and a combination engine 808.

The calculation time determination engine 802 determines when the EWT is to be calculated for a user device 702A. In some cases, the EWT is computed for each device every 15 minutes (or other threshold time period). The calculation time determination engine 802 stores a timestamp associated with a latest time when the EWT was calculated for the user device 702A and recalculates the EWT if 15 minutes (or the other threshold time period) have passed since the last calculation. Alternatively or in addition, the EWT may be calculated when a trigger event occurs. The trigger event may be, for example, another device in the user queue being connected to one of the agent devices 706A-C, an agent device 706A-C logging on (e.g., to begin work by the associated agent) or an agent device 706A-C logging off (e.g., to end work by the associated agent).

The rule-based engine 804 calculates the EWT using a rule-based formula based on, for example, the predicted average hold time and/or the number of agents associated with the user queue. For example, the rule-based formulas shown at 602 or 604 may be used. In some cases, the calculation time determination engine 802 may cause the rule-based engine 804 to apply different rule-based formulas at different times. For example, as shown in FIG. 6, the calculation of 602 is performed every 15 minutes, while the calculation of 604 is performed after every call during the first 15 minutes.

The statistical engine 806 uses statistical (e.g., artificial intelligence and/or machine learning) techniques to calculate the EWT. The statistical engine 806 may leverage a model based on at least one of: the historic wait time data 716, the number of agents associated with the user queue, the average hold time, the day of the week, the time of day, or the calendar date.

The combination engine 808 receives the EWT values calculated by the rule-based engine 804 and the statistical engine 806. The combination engine 808 combines those results to generate an EWT. For example, the mean or the median value of the estimated wait time values computed by the rule-based engine 804 and the statistical engine 806 may be used. Furthermore, while a single rule-based engine 804 and a single statistical engine 806 are illustrated here, the disclosed technology may be implemented with multiple mathematical formula engines 804 and/or multiple statistical engines 806. Thus, the mean or the median calculations may be done with more than two numbers as inputs.

In one example use case, there are two mathematical formula engines 804 and one statistical engine 806. A first rule-based engine 804 calculates the EWT as the average hold time divided by the number of agents associated with the user queue 708 every 15 minutes. A second rule-based engine 804 calculates the EWT as the average hold time divided by the number of agents associated with the user queue 708 after every call associated with the user queue 708 is terminated. The statistical engine 806 calculates the EWT using a machine learning model. The combination engine 808 calculates a median of the estimated wait time values computed by the two mathematical formula engines 804 and the statistical engine 806. That median value is used as the computed EWT, which may be provided to the user device for audio playback or visual display at the user device.

Figure 9:
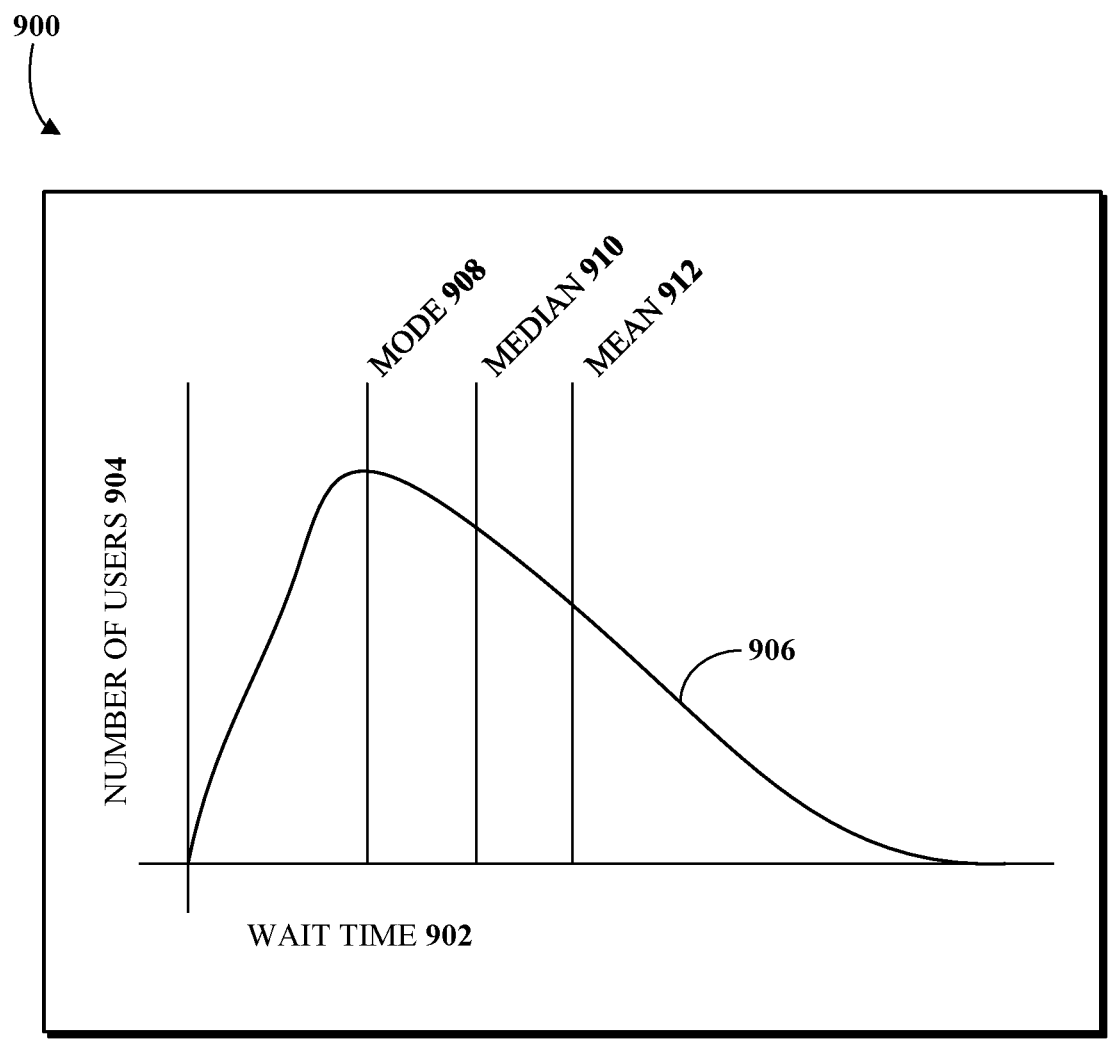
FIG. 9 is an example graphical output of wait times of a set of users in a contact center system.

FIG. 9 is an example graphical output 900 of wait times of a set of users in a contact center system. The graphical output 900 may be presented at an administrator device associated with the contact center in response to a prompt, from the administrator device, to display wait times associated with a specified user queue (e.g., French speaking user seeking vehicle financing) during a specified time period (e.g., November 2022).

As shown, the graphical output 900 includes a graph of wait times 902 versus the number of users 904 (or user devices) having each wait time. The wait time is the amount of time between the time when the user device accessed the contact center and the time when the user device was connected to an agent device. The graph includes a curve 906 showing the number of users having each wait time. The mode 908, the median 910, and the mean 912 are indicated on the curve 906.

According to some implementations, the server 704 or a server of the contact center 400 generates the graphical representation 900 of wait times for user devices in at least one user queue, for example, based on the historic wait time data 716. The contact center 400 or the server 704 transmits the graphical representation to the administrator device associated with the contact center or another destination device.

Some aspects may relate to a method, computer-readable medium, apparatus or system to perform the functions disclosed herein. Some aspects may relate to means for performing the functions disclosed herein.

Some implementations are described below as numbered examples (Example 1, 2, 3, etc.). These examples are provided as examples only and do not limit the other implementations disclosed herein.

Example 1 is a method comprising: receiving, at a server and via a network, a request for communication with a contact center agent device from a user device; determining a number of devices preceding the user device in a user queue of devices for communicating with the contact center agent device, the user queue being stored at the server using a queue data structure; determining a number of contact center agent devices available for the communication based on network connection data between the server and the contact center agent devices; periodically calculating an estimated wait time for the user device using a combination engine that takes into account the number of devices preceding the user device, the number of contact center agent devices, and previous wait times of other user devices requesting communications with the contact center agent device; and transmitting, to the user device, an output associated with the estimated wait time.

In Example 2, the subject matter of Example 1 includes, wherein the combination engine calculates a combination of the number of devices preceding the user device divided by the number of agent devices and a value computed by a statistical engine based on the previous wait times of the other devices requesting the communications with the contact center agent device.

In Example 3, the subject matter of Examples 1-2 includes, wherein the combination engine calculates a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

In Example 4, the subject matter of Examples 1-3 includes, wherein the request comprises natural language text or speech, the method comprising: identifying, using a natural language processing engine, features of a contact center agent based on the natural language text or speech; selecting, from multiple user queues, the user queue for the user device based on the features.

In Example 5, the subject matter of Examples 1-4 includes, wherein periodically calculating the estimated wait time comprises calculating the estimated wait time once every threshold time period.

In Example 6, the subject matter of Examples 1-5 includes, wherein periodically calculating the estimated wait time comprises calculating the estimated wait time when a device in the user queue is connected to a contact center agent device.

In Example 7, the subject matter of Examples 1-6 includes, wherein periodically calculating the estimated wait time comprises calculating the estimated wait time when the number of contact center agent devices available for the communication changes.

In Example 8, the subject matter of Examples 1-7 includes, generating a graphical representation of wait times for user devices in at least one user queue; and transmitting the graphical representation to an administrator device.

In Example 9, the subject matter of Examples 1-8 includes, determining that the estimated wait time exceeds a callback threshold; providing, to the user device, a prompt to receive a callback via a user-specified communication account when the contact center agent device becomes available; and in response to acceptance of the prompt, upon determining that the contact center agent device is available, connecting the contact center agent device with the user-specified communication account.

Example 10 is a non-transitory computer readable medium storing instructions operable to cause one or more processors to perform operations comprising: receiving, at a server and via a network, a request for communication with a contact center agent device from a user device; determining a number of devices preceding the user device in a user queue of devices for communicating with the contact center agent device, the user queue being stored at the server using a queue data structure; determining a number of contact center agent devices available for the communication based on network connection data between the server and the contact center agent devices; periodically calculating an estimated wait time for the user device using a combination engine that takes into account the number of devices preceding the user device, the number of contact center agent devices, and previous wait times of other user devices requesting communications with the contact center agent device; and transmitting, to the user device, an output associated with the estimated wait time.

In Example 11, the subject matter of Example 10 includes, wherein the combination engine calculates a combination of the number of devices preceding the user device divided by the number of agent devices and a number computed by a statistical engine based on the previous wait times of the other devices requesting the communications with the contact center agent device.

In Example 12, the subject matter of Examples 10-11 includes, wherein the combination engine calculates a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by an artificial intelligence engine based on the previous wait times of the other devices requesting the communications with the contact center agent device.

In Example 13, the subject matter of Examples 10-12 includes, wherein the request comprises a natural language request, the method comprising: identifying, using a natural language processing engine, features of a contact center agent based on the natural language text or speech; selecting, from multiple user queues, the user queue for the user device based on the features.

In Example 14, the subject matter of Examples 10-13 includes, wherein periodically calculating the estimated wait time comprises calculating the estimated wait time once every preset time period.

In Example 15, the subject matter of Examples 10-14 includes, wherein periodically calculating the estimated wait time comprises calculating the estimated wait time upon connection of a device in the user queue with a contact center agent device.

In Example 16, the subject matter of Examples 10-15 includes, the operations comprising: generating a graphical representation of wait times for user devices in at least one user queue; and transmitting the graphical representation over a network for display at a destination device.

Example 17 is an apparatus comprising: a memory; and a processor configured to execute instructions stored in the memory to: receive, at a server and via a network, a request for communication with a contact center agent device from a user device; determine a number of devices preceding the user device in a user queue of devices for communicating with the contact center agent device, the user queue being stored at the server using a queue data structure; determine a number of contact center agent devices available for the communication based on network connection data between the server and the contact center agent devices; periodically calculate an estimated wait time for the user device using a combination engine that takes into account the number of devices preceding the user device, the number of contact center agent devices, and previous wait times of other user devices requesting communications with the contact center agent device; and transmit, to the user device, an output associated with the estimated wait time.

In Example 18, the subject matter of Example 17 includes, wherein the combination engine calculates the estimated wait time based on at least one of: the number of devices preceding the user device divided by the number of agent devices or a value computed by a statistical engine based on the previous wait times of the other devices requesting the communications with the contact center agent device.

In Example 19, the subject matter of Examples 17-18 includes, wherein the combination engine calculates a median of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

In Example 20, the subject matter of Examples 17-19 includes, wherein the request is in a natural language, the method comprising: identifying, using a natural language processing engine, features of a contact center agent based on the natural language text or speech; selecting, from multiple user queues, the user queue for the user device based on the features.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    receiving, at a server and via a network, a request for communication with a contact center agent device from a user device;
    adding, at the server, the user device to a user queue of devices for communicating with the contact center agent device, the user queue being stored at the server using a queue data structure;
    determining a number of devices preceding the user device in the user queue;
    determining a number of contact center agent devices available for the communication based on network connection data between the server and the contact center agent devices, the network connection data including a connection status of at least one contact center agent device to the server;
    periodically calculating an estimated wait time for the user device using a combination engine that takes into account the number of devices preceding the user device, the number of contact center agent devices, and wait times of user devices, distinct from the user device, requesting communications with the contact center agent device; and
    transmitting, to the user device, an output associated with the estimated wait time.

2. The method of claim 1, wherein the combination engine calculates a combination of the number of devices preceding the user device divided by the number of agent devices and a value computed by a statistical engine based on the previous wait times of the other devices requesting the communications with the contact center agent device.

3. The method of claim 1, wherein the combination engine calculates a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

4. The method of claim 1, wherein the request comprises natural language text or speech, the method comprising:
    identifying, using a natural language processing engine, features of a contact center agent based on the natural language text or speech; and
    selecting, from multiple user queues, the user queue for the user device based on the features.

5. The method of claim 1, wherein periodically calculating the estimated wait time comprises calculating the estimated wait time once every threshold time period.

6. The method of claim 1, wherein periodically calculating the estimated wait time comprises calculating the estimated wait time when a device in the user queue is connected to a contact center agent device.

7. The method of claim 1, wherein periodically calculating the estimated wait time comprises calculating the estimated wait time when the number of contact center agent devices available for the communication changes.

8. The method of claim 1, comprising:
    generating a graphical representation of wait times for user devices in at least one user queue; and
    transmitting the graphical representation to an administrator device.

9. The method of claim 1, comprising:
    determining that the estimated wait time exceeds a callback threshold;
    providing, to the user device, a prompt to receive a callback via a user-specified communication account when the contact center agent device becomes available; and
    in response to acceptance of the prompt, upon determining that the contact center agent device is available, connecting the contact center agent device with the user-specified communication account.

10. At least one non-transitory computer readable medium storing instructions operable to cause one or more processors to perform operations comprising:
    receiving, at a server and via a network, a request for communication with a contact center agent device from a user device;
    adding, at the server, the user device to a user queue of devices for communicating with the contact center agent device, the user queue being stored at the server using a queue data structure;
    determining a number of devices preceding the user device in the user queue;
    determining a number of contact center agent devices available for the communication based on network connection data between the server and the contact center agent devices, the network connection data including a connection status of at least one contact center agent device to the server;
    periodically calculating an estimated wait time for the user device using a combination engine that takes into account the number of devices preceding the user device, the number of contact center agent devices, and wait times of user devices, distinct from the user device, requesting communications with the contact center agent device; and transmitting, to the user device, an output associated with the estimated wait time.

11. The at least one computer readable medium of claim 10, wherein the combination engine calculates a combination of the number of devices preceding the user device divided by the number of agent devices and a number computed by a statistical engine based on the previous wait times of the other devices requesting the communications with the contact center agent device.

12. The at least one computer readable medium of claim 10, wherein the combination engine calculates a mean of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by an artificial intelligence engine based on the previous wait times of the other devices requesting the communications with the contact center agent device.

13. The at least one computer readable medium of claim 10, wherein the request comprises a natural language request, the operations comprising:
 identifying, using a natural language processing engine, features of a contact center agent based on the natural language text or speech; and
 selecting, from multiple user queues, the user queue for the user device based on the features.

14. The at least one computer readable medium of claim 10, wherein periodically calculating the estimated wait time comprises calculating the estimated wait time once every preset time period.

15. The at least one computer readable medium of claim 10, wherein periodically calculating the estimated wait time comprises calculating the estimated wait time upon connection of a device in the user queue with a contact center agent device.

16. The at least one computer readable medium of claim 10, the operations comprising:
 generating a graphical representation of wait times for user devices in at least one user queue; and
 transmitting the graphical representation over a network for display at a destination device.

17. A system comprising:
 one or more memories; and
 one or more processors configured to execute instructions stored in the one or more memories to:

receive, at a server and via a network, a request for communication with a contact center agent device from a user device;

add, at the server, the user device to a user queue of devices for communicating with the contact center agent device, the user queue being stored at the server using a queue data structure;

determine a number of devices preceding the user device in the user queue;

determine a number of contact center agent devices available for the communication based on network connection data between the server and the contact center agent devices, the network connection data including a connection status of at least one contact center agent device to the server;

periodically calculate an estimated wait time for the user device using a combination engine that takes into account the number of devices preceding the user device, the number of contact center agent devices, and wait times of user devices, distinct from the user device, requesting communications with the contact center agent device; and transmit, to the user device, an output associated with the estimated wait time.

18. The system of claim 17, wherein the combination engine calculates the estimated wait time based on at least one of: the number of devices preceding the user device divided by the number of agent devices or a value computed by a statistical engine based on the previous wait times of the other devices requesting the communications with the contact center agent device.

19. The system of claim 17, wherein the combination engine calculates a median of (i) an average hold time multiplied by a quotient of the number of devices preceding the user device divided by the number of agent devices, as computed every threshold time period, (ii) the average hold time multiplied by the quotient of the number of devices preceding the user device divided by the number of agent devices, as computed at a call termination of one of the devices preceding the user device, and (iii) a value computed by a statistical engine based on the previous wait times of the other devices requesting the communications with the contact center agent device.

20. The system of claim 17, wherein the request is in a natural language, the one or more processors configured to execute instructions stored in the one or more memories to:
 identify, using a natural language processing engine, features of a contact center agent based on the natural language text or speech; and
 select, from multiple user queues, the user queue for the user device based on the features.

* * * * *